US010498180B2

(12) United States Patent
Liang

(10) Patent No.: US 10,498,180 B2
(45) Date of Patent: Dec. 3, 2019

(54) STATOR MAGNETIC CORE BRUSHLESS MOTOR APPARATUS, SYSTEM AND METHODS

(71) Applicant: Hongxin Liang, Foshan (CN)

(72) Inventor: Hongxin Liang, Foshan (CN)

(73) Assignee: CANAS SUN, INC., Concord, CA (US)

( * ) Notice: Subject to any disclaimer, the term of this patent is extended or adjusted under 35 U.S.C. 154(b) by 486 days.

(21) Appl. No.: 15/221,526

(22) Filed: Jul. 27, 2016

(65) Prior Publication Data

US 2017/0033618 A1 Feb. 2, 2017
US 2017/0288478 A9 Oct. 5, 2017

(30) Foreign Application Priority Data

Jul. 28, 2015 (CN) .......................... 2015 1 0455964

(51) Int. Cl.
*H02K 1/12* (2006.01)
*H02K 1/02* (2006.01)
(Continued)

(52) U.S. Cl.
CPC .............. *H02K 1/12* (2013.01); *C21D 1/773* (2013.01); *C21D 6/007* (2013.01); *C21D 6/008* (2013.01);
(Continued)

(58) Field of Classification Search
CPC ........ C21D 1/773; C21D 6/007; C21D 6/008; C21D 9/0068; C22C 45/02; C22C 38/002;
(Continued)

(56) References Cited

U.S. PATENT DOCUMENTS 4,716,556 A * 12/1987 Raskin ................... G01V 1/201
310/26
5,160,379 A * 11/1992 Yoshizawa ............... C21D 1/04
148/108
(Continued)

FOREIGN PATENT DOCUMENTS

CN 203872020 U * 10/2014
WO WO 2012097482 A1 * 7/2012 ......... C04B 35/2658

OTHER PUBLICATIONS

Translation of foreign document CN 203872020 U (year:2014).*

*Primary Examiner* — Alex W Mok
(74) *Attorney, Agent, or Firm* — Richard Bennett Salles

(57) ABSTRACT

A stator magnetic core and manufacturing process thereof and brushless motor comprising the stator magnetic core, wherein the stator magnetic core is made of iron-based amorphous material containing Co and V, and the composition of the iron-based amorphous material by weight percentage is: Co 0.8-1.4%, V 0.6-1.2%, B 2.7-3.3%, Si 6.5-8%, and Fe for the rest. A brushless DC motor, comprising a rotor spindle, a front end cover, a housing, a stator magnetic core and a rear end cover, wherein the stator magnetic core is assembled inside the housing, a stator coil is disposed inside the stator magnetic core, and the stator magnetic core and the stator core don't contact each other and an insulating layer is formed between them. The stator magnetic core in the present invention is made of iron-based amorphous material containing Co and V. Through addition of Co and V elements, the stator magnetic core refines crystalline grain and raises material toughness. It not only overcomes the previous problem of difficult machining and shaping but also raises the efficiency of the brushless DC motor containing this stator magnetic core. It is a breakthrough process.

21 Claims, 15 Drawing Sheets

(51) Int. Cl.

| | |
|---|---|
| *H02K 15/02* | (2006.01) |
| *H02K 21/04* | (2006.01) |
| *C22C 38/12* | (2006.01) |
| *C23C 26/00* | (2006.01) |
| *C22C 38/02* | (2006.01) |
| *C22C 38/00* | (2006.01) |
| *C22C 45/02* | (2006.01) |
| *C21D 9/00* | (2006.01) |
| *C21D 6/00* | (2006.01) |
| *C21D 1/773* | (2006.01) |
| *H02K 1/04* | (2006.01) |
| *C22C 38/10* | (2006.01) |

(52) U.S. Cl.
CPC .......... *C21D 9/0068* (2013.01); *C22C 38/002* (2013.01); *C22C 38/02* (2013.01); *C22C 38/10* (2013.01); *C22C 38/12* (2013.01); *C22C 45/02* (2013.01); *C23C 26/00* (2013.01); *H02K 1/02* (2013.01); *H02K 1/04* (2013.01); *H02K 15/02* (2013.01); *H02K 21/046* (2013.01); *H02K 2213/03* (2013.01)

(58) Field of Classification Search
CPC ......... C22C 38/02; C22C 38/10; C22C 38/12; C23C 26/00; H02K 15/02; H02K 1/02; H02K 1/04; H02K 1/12; H02K 21/046; H02K 2213/03
USPC .......................................................... 310/43
See application file for complete search history.

(56) References Cited

U.S. PATENT DOCUMENTS

| | | | | |
|---|---|---|---|---|
| 5,432,658 A | * | 7/1995 | Kajita | G11B 5/588 360/291.7 |
| 5,671,524 A | * | 9/1997 | Damsky | H02K 15/024 148/108 |
| 5,808,392 A | * | 9/1998 | Sakai | H02K 1/278 310/156.07 |
| 5,935,722 A | * | 8/1999 | Moorhead | C04B 37/021 148/105 |
| 5,996,554 A | * | 12/1999 | Tojo | H02K 26/00 123/399 |
| 6,509,667 B1 | * | 1/2003 | El-Antably | H02K 15/02 310/156.21 |
| 7,067,950 B2 | * | 6/2006 | Hirzel | H02K 1/02 310/216.094 |
| 2004/0150285 A1 | * | 8/2004 | Decristofaro | H01F 1/15366 310/216.065 |
| 2008/0246362 A1 | * | 10/2008 | Hirzel | H02K 21/12 310/156.02 |
| 2009/0072639 A1 | * | 3/2009 | Seneff | H02K 1/2793 310/43 |
| 2009/0267428 A1 | * | 10/2009 | Nakahara | H02K 1/02 310/59 |
| 2011/0074230 A1 | * | 3/2011 | Hasegawa | F04D 29/023 310/43 |
| 2012/0107603 A1 | * | 5/2012 | DiDomizio | H01F 1/16 428/328 |
| 2013/0199674 A1 | * | 8/2013 | Altschuler | C21D 1/25 148/328 |
| 2013/0199679 A1 | * | 8/2013 | Toji | B21D 22/02 148/653 |
| 2013/0264894 A1 | * | 10/2013 | Kim | H02K 1/02 310/44 |
| 2014/0069555 A1 | * | 3/2014 | Inaguma | C21D 8/0257 148/208 |
| 2015/0035394 A1 | * | 2/2015 | Bulatow | C22C 38/02 310/66 |
| 2015/0097458 A1 | * | 4/2015 | Wang | H02K 1/2766 310/156.01 |

* cited by examiner

STATOR MAGNETIC CORE BRUSHLESS MOTOR APPARATUS, SYSTEM AND METHODS

RELATED APPLICATIONS

This application is related to Application No. CN 10496722.6, filed by the Applicant on Jul. 28, 2015 in the Republic of China. Applicant herein claims foreign priority to the previously filed application, CN104967226.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever. The following notice applies to the disclosure herein and to the drawings that form a part of this document: Copyright 2015-2016, Canas Sun. Inc., dba Robust Motor Co., All Rights Reserved.

TECHNICAL FIELD

This patent document pertains generally to apparatus, systems and methods (systems, apparatus, methodologies, computer program products manufacturing processes, etc.) for Stator Magnetic Core Brushless Motor technology, a stator magnetic core, its manufacturing process and a brushless motor comprising the stator magnetic core, and more particularly to a brushless DC motor stator magnetic core made of iron-based amorphous materials and in the manufacturing processes therein.

BACKGROUND

Stators in AC & DC electric motors are generally made of silicon steel sheets. With the extension of application fields, motors are being developed in a direction of high speed and high power. The electromagnetic characteristics of silicon steel sheets limit their use to a maximum alternative frequency of about 300 HZ. Above this frequency, iron loss will make silicon steel sheets generate heat, dramatically impairing efficiency and often hunting often out the coils.

Iron-based amorphous material has excellent high-frequency characteristics, extremely low iron loss and desirable additivity, making its application range increasingly wide. In the aspect of high power, it shows a trend of replacing ferrite. However, the extreme thinness of the amorphous strip and its sensitivity to temperature and stress present challenges to the machining process when iron-based amorphous material is used to manufacture motor rotors and stators.

As iron-based amorphous material is normally only 20-26 μm thick, a small slip in shaping, heat treatment, bonding or other processes will damage the materials electromagnetic properties. For example, during electrical discharge machining, local "spark" temperature makes amorphous material "recrystallized", thereby losing amorphous characteristics and causing machining failure.

The stress generated from eating and bonding is also an important threat to amorphous material. Likewise, a tiny mistake in the heat treatment process may also result in failure.

At present, iron-based amorphous material is successfully applied in a minority of rotors but no application in stators with a complex shape has been reported. Therefore, what is needed is a novel, iron-based amorphous material for complex-shaped and conventional stators.

SUMMARY OF THE INVENTION

In several embodiments, the stains magnetic core is made of iron-based amorphous material comprising Co and V, and the composition of the iron-based amorphous material by weight percentage is: Co 0.8-1.4%, V 0.6-1.2%, B 2.7-3.3%, Si 6.5-8%, and Fe for the remainder.

In a preferred embodiment, a stator magnetic core is made of iron-based amorphous material comprising Co and V, and the composition of the iron-based amorphous material by weight percentage is: Co 1.0-1.2%, V 0.8-1.0%, B 3.1-3.2%, Si 7.2-7.7%, and Fe 85-90%.

In another embodiment, a manufacturing process to produce the stator magnetic core refines crystalline grain and raises material toughness to overcome the difficult machining of iron-based amorphous material.

In another embodiment, a vacuum heat treatment process of the magnetic core initially heats the core to 310° C. and holds this temperature for 20-25 min, then raises the temperature to 345° C. and holds this temperature for 15-20 min, then raises the temperature to 385° C. and holds this temperature for 30-35 min, and finally powers off, cool together with the furnace to 120° C. and tap off.

In another embodiment, a curing process after heat treatment and shaping of the stator magnetic core raises temperature to 80-90° C. then puts the core into a vacuum dipping box, with calling agent V852-12A/B nanoepoxy adhesive, then transfers it to a 110° C. oven five hours later, and keeps it in the oven for two hours.

In another embodiment, the stator magnetic core is cut by a 3500 Ypm carborundum wheel under the protection of a cooling emulsion.

In another embodiment, a brushless DC motor comprising the foregoing stator magnetic core, comprises a rotor spindle, a front end cover, a housing, the stator magnetic core in the embodiments above, and a rear end cover.

In another embodiment, the brushless DC motors of the previous embodiment further comprises a stator magnetic core that is assembled inside the housing, a stator coil that is disposed inside the stator magnetic core, wherein the stator magnetic core and stator coil don't contact each other and wherein an insulating layer is formed between them.

In certain aspects, the embodiment includes the axes of a rotor spindle, wherein the stator magnetic core and the stator coil coincide with each other.

In other various aspects, the embodiment has a rotor bearing that is disposed at one end of the rotor spindle.

In another embodiment, a stator magnetic core is made of iron-based amorphous material comprising Co and V. Through addition of Co and V elements, the stator magnetic core has a refined crystalline grain and improved material toughness.

In certain aspects, the brushless DC motor with the aforementioned features has a motor speed of about 28000 rpm-35000 rpm. In other various aspects, the brushless DC motor is capable of running stably at 30000 rpm without overheating at 87% of full load amps.

In another embodiment, a stator magnetic core comprises iron-based amorphous material further comprising Co and V, wherein the composition of the iron-based amorphous material by weight percentage is Co 0.8-1.4%, V 0.6-1.2%, B 2.7-3.3%, Si 6.5-8% and Fe for the remainder.

In certain aspects, the stator magnetic core is provided wherein the iron-based amorphous material by weight percentage is about Co 0.9-1.1%, V 0.7-0.9%, B 3.0-3.4%, Si 7.2-7.8%, and Fe 87.5%.

In other aspects, the manufacturing, process of the stator magnetic core is provided wherein a vacuum heat treatment process of the stator magnetic core further comprises steps for: raising a first temperature to 310° C.; holding the first temperature for 20-25 min; then raising the first temperature to a second temperature of 345° C.; holding the second temperature for about 15-20 min; raising the second temperature to a third temperature of 385° C.; holding the third temperature for about 30-35 min; then powering off, cooling together with the furnace at a fourth temperature of 120° C.; and then tapping off.

In another embodiment, a manufacturing process of the stator magnetic core is provided wherein a curing process after the heat treatment process and shaping of the stator magnetic core comprises steps for: raising to a first temperature of about 80-90° C.; putting the stator magnetic core into a vacuum dipping box, with a curing agent of V852-12A/B nano-epoxy adhesive, transferring the stator magnetic core to a 110° C. oven five (5) hours later; keeping the stator magnetic core in the 110° C. oven for two (2) hours.

In other aspects, the manufacturing process of the stator magnetic core of Claim 4, wherein the stator magnetic core is cut by a 3500 Ypm carborundum wheel under protection of a cooling emulsion.

In another embodiment, a brushless DC motor, comprises a rotor spindle, a front end cover, a housing, a rear end cover and the stator magnetic core of claim 1, wherein the stator magnetic core is assembled inside the housing; a stator coil being disposed inside the stator magnetic core; the stator magnetic core and the stator coil not contacting each other; and one or more insulating layers formed between them.

In certain aspects, the brushless DC motor is provided wherein the one or more insulating layers formed between them includes at least one insulating, paper layer, in various aspects, one or more insulating layers is air.

In various aspects, the brushless DC motor is provided wherein the axes of a rotor spindle, the stator magnetic core and the stator coil coincide with each other.

In other certain aspects, the brushless DC motor may be provided wherein a lower part of the rotor spindle is disposed inside the housing.

In various aspects, the brushless DC motor is configured wherein most of the lower part of the rotor spindle is inserted and disposed inside the housing.

In other certain aspects, the brushless DC motor is provided wherein the stator magnetic core and one or more insulating layers are configured to reach an efficiency of about 87% at full load.

In various aspects, the brushless DC motor may be configured wherein the rotor bearing is assembled at its bottom end and its top end is exposed through a round hole in the front end cover.

In other certain aspects, the brushless DC motor may be provided wherein rotor bearing is disposed at one end of the rotor spindle.

In other various aspects, the brushless DC motor is provided wherein the stator magnetic core and one or more insulating layers are configured to reach a speed of about 28000-35000 rpm.

In various aspects, the brushless DC motor is configured wherein the stator magnetic core and one or more insulating layers are configured to reach a stable speed of about 30000 rpm.

In another embodiment, a method of providing a DC brushless motor, comprises steps for: insulating a stator magnetic core from a stator coil with one or more insulating layers; isolating the stator magnetic core from the stator coil so that the stator magnetic core does not come in physical contact with the stator coil; curing the stator magnetic core with a nano-epoxy curing agent; machining the stator magnetic core in a cooling emulsion; and forming the stator magnetic core with an iron-based amorphous material comprising at least one element selected from the group consisting of Co and V.

In certain aspects, the method of providing a DC brushless motor provides one or more steps wherein the nano-epoxy curing agent is a V852-12A/B adhesive.

In other various aspects, the method of providing a DC brushless motor further comprises steps for: machining the stator magnetic core by cutting by a 3500 Ypm carborundum wheel in a cooling emulsion.

In other aspects, the method of providing a DC brushless motor further comprises steps for: forming the stator magnetic core with an iron-based amorphous material containing Co and V, wherein the composition of the iron based amorphous material by weight percentage is: Co 0.8-1.4%, V 0.6-1.2%, B 2.7-3.3%, Si 6.5-8%, and the remainder is Fe.

In another embodiment, a method of forming a stator magnetic core, comprising the steps of: separating a stator magnetic core from a stator coil with one or more insulating layers; isolating the stator magnetic core from the stator coil so that the stator magnetic core does not come into physical contact with the stator coil; disposing the stator coil inside the stator magnetic core; and aligning the axes of a rotor spindle with the axes of the stator coil and the stator magnetic core.

In certain aspects, the method of forming a stator magnetic core wherein at least one insulating paper lay r. In various aspects, one or more insulating layers is air.

In other various aspects, the method of forming a stator magnetic core wherein the stator magnetic core is made of iron-based amorphous material containing Co and V.

In other various aspects; the method of forming a stator magnetic core including one or more steps wherein the composition of the iron-based amorphous material by weight percentage is: Co 0.8-1.4%, V 0.6-1.2%, B 2.7-3.3%, Si 6.5-8%, and the remainder is Fe.

In other certain aspects, the method of forming a stator magnetic core further comprising steps for: curing an iron-based amorphous material mass with a nano-epoxy curing agent; shaping the iron-based amorphous material mass of the stator magnetic core workpiece; and machining the iron-based amorphous material mass in a cooling emulsion.

In another embodiment, a method of configuring a stator magnetic core, comprising steps for: separating a stator magnetic core from a stator coil with one or more insulating layers; isolating the stator magnetic core from the stator coil so that the stator magnetic core does not come in physical contact with the stator coil; disposing the stator coil inside the stator magnetic core; and aligning an axes of a rotor spindle with the axes of the stator coil and the stator magnetic core.

In certain aspects, the method of configuring a stator magnetic core may be provided wherein at least one insulating paper layer. In various aspects, one or more insulating layers is air.

In various aspects, the method of configuring a stator magnetic core wherein the stator magnetic core is made of iron-based amorphous material containing Co and V.

In other various aspects the method of configuring a stator magnetic core wherein the stator magnetic core is made of a iron-based amorphous material containing an element selected from the group comprising: Co and V.

In other various aspects, the method of configuring a stator magnetic core wherein the composition of the iron-based amorphous material by weight percentage is: Co 0.8-1.4%, V 0.6-1.2%, B 2.7-3.3%, Si 6.5-8%, and the remainder is Fe.

In certain aspects, the method of configuring a stator magnetic core further comprising steps for: curing an iron-based amorphous material mass with a nano-epoxy curing agent; shaping the iron-based amorphous material mass of the stator magnetic core workpiece, and machining the iron-based amorphous material mass in a cooling emulsion.

In another embodiment, a computer implemented method for heat treating a stator magnetic core, having one or more computers including computer-usable readable storage medium having computer readable program code embodied thereon for causing a computer system to receive one or more signals from one or more sensors for performing one or more process control manufacturing steps for forming a stator magnetic core by raising a first temperature to 310° C.; holding the first temperature for about 20-25 minutes; raising the first temperature to a second temperature at 345° C.; holding the second temperature for about 15-20 min, raising the second temperature to a third temperature at 385° C.; holding the third temperature for about 30-35 min; powering off; cooling together with a fourth temperature of about 120° C.; and tapping off.

In certain aspects, the computer implemented manufacturing process of the stator magnetic core, further comprising steps for curing a stator magnetic core via one or more measurement sensors and one or more computers having process control software applications including computer-usable readable storage medium ha mg computer-readable program code embodied therein for causing a computer system to perform methods for one or more programs of one or more process control manufacturing steps for providing steps for a curing process after the heat treatment process and steps for shaping of the stator magnetic core comprising: raising to a first temperature of about 80-90° C.; putting the stator magnetic core into a vacuum dipping box, with a curing agent of V852-12A/B nano-epoxy adhesive; transferring the stator magnetic core to 110° C. oven five (5) hours later; and keeping the stator magnetic core in the 110° C. oven for two (2) hours.

In various aspects, the computer implemented manufacturing process of the stator magnetic core further comprising steps for shaping the stator magnetic core by cutting with a 3500 Ypm carborundum wheel under the protection of a cooling emulsion.

In another embodiment, a brushless DC motor, comprising: a rotor spindle, front end cover, a housing, a rear end cover and a stator magnetic core wherein the stator magnetic core is assembled inside a housing and wherein the stator magnetic core includes nanocrystalline materials with grain sizes of about 100 nanometers or less; a stator coil being disposed inside the stator magnetic core; the stator magnetic core and the stator coil not contacting each other; one or more insulating layers formed between the magnetic core and the coil, a nanocrystalline microstructure portion formed within at least a portion of the stator magnetic core having a high saturation induction of at least about 1.5 Tesla (T), low core loss, and low saturation magnetostriction of an absolute value less than $4\times10-6$.

In certain aspects, the brushless DC motor further comprising: a stator magnetic core having amorphous alloys that form a nanocrystalline microstructure after curing by a nano-epoxy adhesive to form bulk amorphous magnetic components having lower operating temperatures that magnetize and demagnetize more efficiently, wherein the stator magnetic core has one or more insulating layers formed between the stator magnetic core and stator magnetic coil including at least one insulating paper layer. In various aspects, one or more insulating layers is air.

In various aspects, the brushless DC motor wherein the stator magnetic core and one or more insulating layers are configured to reach a speed of about 28000-35000 rpm.

In various aspects, the brushless DC motor wherein the stator magnetic core grains are oriented in the direction of the rolling process.

In various aspects, the brushless DC motor wherein the stator magnetic core grains are comprised of a non-oriented optimized alloy.

In various aspects, the brushless DC motor wherein at least one of the stator magnetic core and one or more insulating layers are configured to have at least a portion of low core loss, bulk amorphous metal magnetic components.

In various aspects, the brushless DC motor wherein the low core loss, bulk amorphous metal magnetic components are cured by a curing agent of V852-12A/B nano-epoxy adhesive.

In various aspects, the brushless DC motor wherein the nano-epoxy adhesive has a viscosity of less than about 1000 cps and a thermal expansion coefficient of about 10 ppm.

In various aspects, the brushless DC motor wherein the nano-epoxy adhesive applied according to a method selected from a group consisting of dipping, spraying, brushing, and electrostatic deposition.

In various aspects the brushless DC motor wherein the nano-epoxy adhesive is selected from a group consisting of chemically activated adhesive, thermally activated adhesive, and adhesive activated by exposure to ultra-violet radiation.

In various aspects, the brushless DC motor wherein the low core loss, bulk amorphous metal magnetic components are bonded by impregnation with the nano-epoxy adhesive, diluted 1:5 by volume with acetone to reduce viscosity and enhance penetration in the grains.

In various aspects, the brushless DC motor may wherein the stator magnetic core grains are configured to operate at a flux density of approximately about 1.3 Tesla (T) and a core-loss of less than or equal to 5.7 watts-per-kilogram of amorphous metal material.

In various aspects, the brushless DC motor wherein the brushless DC motor is configured to reach a speed of about 30000 rpm at a steady state.

In another embodiment, a method of providing a DC brushless motor comprising steps for: insulating a stator magnetic core from a stator coil with one or more insulating layers, isolating the stator magnetic core from the stator coil so that the stator magnetic core does not come in physical contact with the stator coil; curing the stator magnetic core with a nano-epoxy curing agent; machining the stator magnetic core in a cooling emulsion; and forming the stator magnetic core with an iron-based amorphous material containing at least one element selected from the group consisting of: Co and V.

In certain aspects, the method of providing a DC brushless motor further comprising one or more steps wherein the nano-epoxy curing agent is a V852-12A/B adhesive.

In various aspects, the method of providing a DC brushless motor further comprising steps for: machining the stator magnetic core by cutting by a 3500 Ypm carborundum wheel in a cooling emulsion.

In other various aspects, the method of providing a DC brushless motor is provided further comprising steps for: forming the stator magnetic core with an iron-based amorphous material containing Co and V, wherein the composition of the iron-based amorphous material by weight percentage Co 0.8-1.4%, V 0.6-1.2%, B 2.7-3.3%, Si 6.5-8%, and Fe for the remainder.

In another embodiment, a method of forming a stator magnetic core, comprising steps for: creating a compound of iron-based amorphous material comprising at least one element selected from the group consisting of: Co and V, and the compound having a composition by weight percentage of Co 0.8-1.4%, V 0.6-1.2%, B 2.7-3.3%, Si 6.5-8%, and remainder Fe, conforming a material mass workpiece from the compound; applying a vacuum heat treatment process to the workpiece, raising a first temperature to 310° C.; holding the first temperature for 20-25 min at first; raising the first temperature to a second temperature at 345° C.; holding the second temperature for about 15-20 min; raising the second temperature to a third temperature at 385° C.; holding the third temperature for about 30-35 min; powering off, cooling together to a fourth temperature of 120° C.; and tapping off; curing the stator magnetic core by raising the stator magnetic core workpiece to a first temperature of about 80-90° C.; putting the stator magnetic core workpiece into a vacuum dipping box with a curing agent of V852-12A/B nano-epoxy adhesive; transferring the stator magnetic core to a 110° C. oven five (5) hours later; keeping the stator magnetic core in the 110° C. oven for two (2) hours; shaping and machining the stator magnetic core by cutting the stator magnetic core workpiece by a 3500 Ypm carborundum wheel under the protection of a cooling emulsion; forming a nanocrystalline microstructure within a portion of the stator magnetic core with grain sizes of about 100 nanometers or less and having a saturation induction of at least 1.5 Tesla (T) and low core loss bulk amorphous metal magnetic components, wherein the low core loss bulk amorphous metal magnetic components are bonded by impregnation with the nano-epoxy adhesive to provide stator magnetic core grains having a flux density of about 1.3 Tesla (T) and core loss of less than or equal to about 5.7 watts-per-kilogram of amorphous metal material, and isolating the stator magnetic core from the stator coil with one or more insulating, layers so that the stator magnetic core does not come in physical contact with the stator coil by disposing the stator coil inside the stator magnetic core separated by the one or more insulating layers.

In certain aspects, the method of forming a stator magnetic core wherein at least one insulating paper layer. In various aspects, one or more insulating layers is air.

In various aspects, the method of forming a stator magnetic core further includes one or more steps wherein the stator magnetic core is made of iron-based amorphous material containing approximately by weight percentage, about Co 1% and V 0.8%.

In various aspects, the method of forming a stator magnetic core comprising one or more steps wherein the V852-12A/B nano-epoxy adhesive is replaced with a nano-epoxy adhesive compound having a viscosity of less than about 1000 cps and a thermal expansion coefficient of about 10 ppm.

In other certain aspects, the method of forming a stator magnetic core comprising one or more steps wherein the nano-epoxy adhesive is replaced with a compound having a viscosity of less than about 1000 cps and a thermal expansion coefficient of about 10 ppm.

In other certain aspects, the method of forming a stator magnetic core comprising steps wherein the low core loss, bulk amorphous metal magnetic components are bonded by impregnation with the nano-epoxy adhesive diluted by 1:5 by volume with acetone to enhance penetration in the grains.

BRIEF DESCRIPTION OF THE DRAWINGS

Having, thus described the invention in general terms, reference will now be made to the accompanying drawings, which are not necessarily drawn to scale, and wherein.

DETAILED DESCRIPTION OF THE INVENTION

The present invention is directed to Brushless DC Motors, Stator Magnetic Cores and systems, methods, and apparatuses thereof.

Figure 1:
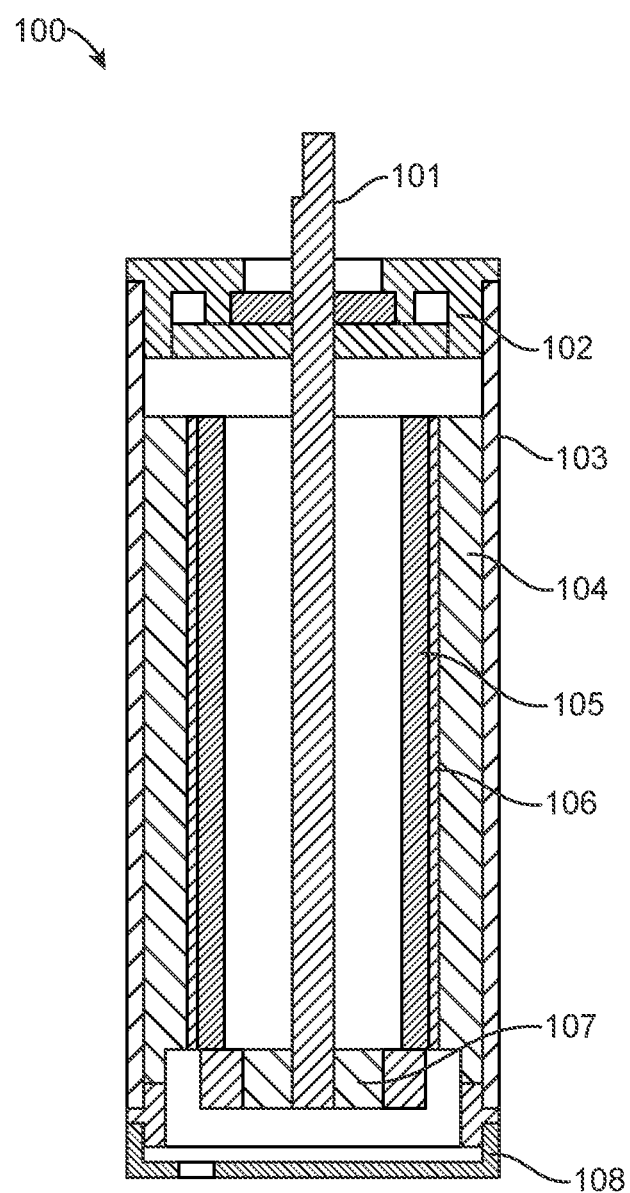
FIG. 1 is front, sectional view of an embodiment of the present invention.

In one embodiment as shown in FIG. 1, a stator magnetic core 104 is comprised of iron-based amorphous material including Co and V. In certain aspects, the stator magnetic core is made of iron-based amorphous material including Co and V, and the composition of the iron-based amorphous material by weight percentage is: Co 0.8-1.4%, V 0.6-1.2%, B 2.7-3.3%, Si 6.5-8%, and Fe for the remainder. Adjacent to the core is the housing 103 and one or more insulating layers 106. In some aspects, the stator magnetic core 104 concentrically encloses a spindle 101. In some aspects, a bearing 107 is adjacent to the spindle 101 and enclosed by a bottom cover 108 and a top cover 102 and a housing 103. One or more insulating layers 106 separates a coil 105 from a stator magnetic core 104.

Figure 2:
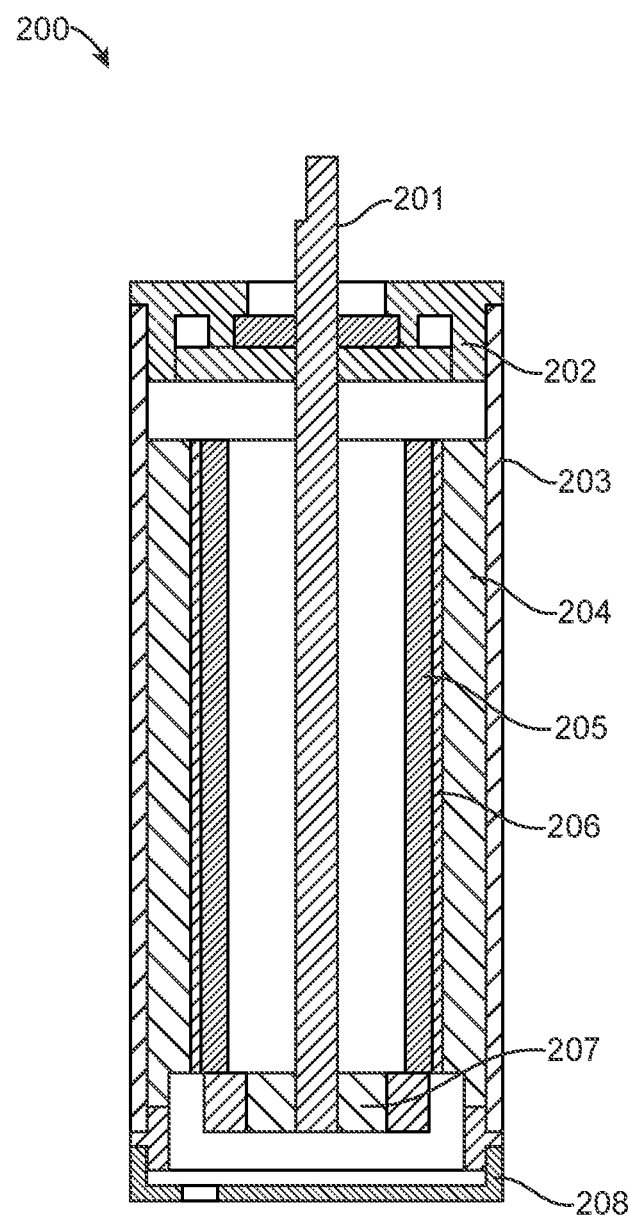
FIG. 2 is front, sectional view of an embodiment of the present invention.

In a preferred embodiment as shown in FIG. 2, a stator magnetic core 204 is made of iron-based amorphous material including Co and V and the composition of the iron-based amorphous material by weight percentage is: Co 1-1.2%, V 0.8-1.0%, B 3.1-3.2%, Si 7.2-7.7% and Fe 85-90%. Adjacent to the core is the housing 203 and one or more insulating layers 206. In some aspects, the stator magnetic core 304 concentrically encloses a spindle 201. In some aspects, a bearing 207 is adjacent to the spindle 201 and enclosed by a bottom cover 208 and a top cover 202 and a housing 203. One or more insulating layers 206 separates a coil 205 from a stator magnetic core 204.

Figure 3:
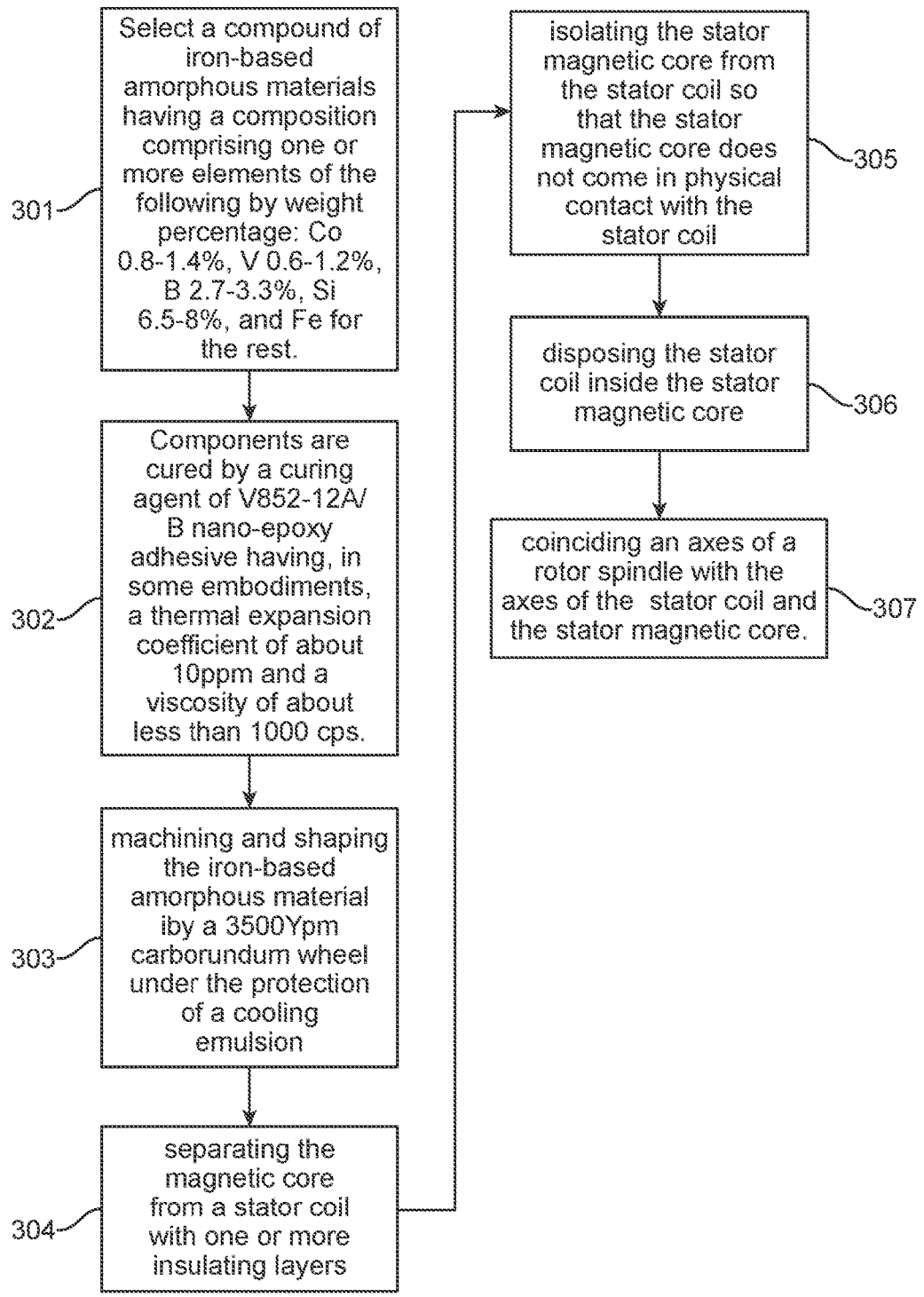
FIG. 3 is a block flow diagram of a manufacturing process to produce the stator magnetic core.

In another embodiment as illustrated in FIG. 3, a method of forming a stator magnetic core includes steps for selecting 301 a compound of iron-based amorphous materials having a composition that comprises one or more elements of the following by weight percentage, that is: Co 0.8-1.4%, V 0.6-1.2%, B 2.7-3.3%, Si 6.5-8%, and Fe for the remainder, wherein the resulting compound is heated and cured 302 such that the resulting microstructure is a nanocrystalline that refines crystalline grain and raises material toughness to overcome the difficult machining and shaping of iron-based amorphous material including steps for 303 cutting an unfinished core workpiece by a 3500 Ypm carborundum wheel under the protection of cooling emulsion, and steps for 304 separating a stator magnetic core from a stator coil with one or more insulating layers; isolating 305 the stator magnetic, core from the stator coil so that the stator magnetic core does not come in physical contact with the stator coil; disposing 306 the stator coil inside the stator magnetic core; and coinciding 307 an axes of a rotor spindle with the axes of the stator coil and the stator magnetic core.

In certain aspects, the method of forming a stator magnetic core includes one or more steps wherein at least one of the one or more insulating layers is an insulating paper having a thickness of about 0.02-0.06 mm.

In other various aspects, the method of forming a stator magnetic core includes one or more steps wherein the stator magnetic core is made of iron-based amorphous material containing Co and V.

In other various aspects, the method of forming a stator magnetic core includes one or more steps wherein the composition of the iron-based amorphous material by weight percentage is: Co 0.8-1.4%, V 0.6-1.2%, B 2.7-3.3%, Si 6.5-8%, and Fe, heating the stator magnetic core work piece and curing the stator magnetic core work piece with a nano-epoxy adhesive curing agent wherein the resulting microstructure is a nanocrystalline that refines crystalline grain and refines material toughness 303, cutting an unfinished core work piece by a 3500 Ypm carborundum wheel under the protection of cooling emulsion to overcome the difficult machining and shaping of iron based amorphous material 303, separating a stator magnetic core from a stator coil with one or more insulating layers 304, isolating the stator magnetic core from the stator coil so that the stat mag core does not come into contact with the stator coil 305 disposing the stator coil inside the stator magnetic core 306, and coinciding an axes of a rotor spindle with the axes of the stator coil and the stator magnetic core 307.

Figure 4:
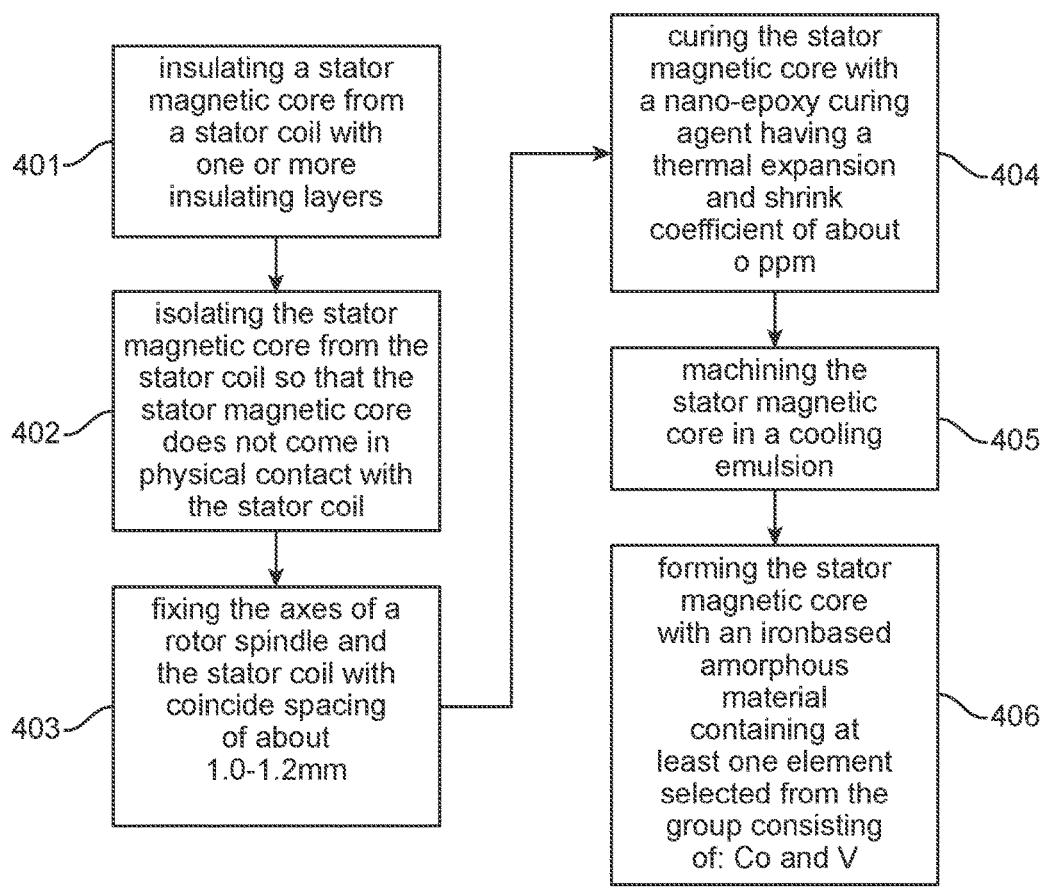
FIG. 4 is a block flow diagram for a manufacturing process configuring a stator magnetic core to produce a significantly raised efficiency.

In another embodiment, now referring to FIG. 4, a method for producing a brushless DC motor comprises steps for a manufacturing process configuring a stator magnetic core to produce a significantly raised efficiency including further steps for insulating a stator magnetic core from a stator coil with one or more insulating layers 401; isolating the suitor magnetic core from the stator coil 402 so that the stator magnetic core does not come in physical contact with the stator coil by fixing the axes of a rotor spindle and the stator coil with coincide spacing of about 1.0-1.2 mm 403; curing the stator magnetic core with a nano-epoxy curing agent having a thermal expansion and shrink coefficient of about 0 ppm 404; machining 405 the stator magnetic core in a cooling emulsion; and forming the stator magnetic core with an iron-based amorphous material containing at least one element selected from the group consisting of: Co and V 406, therein the iron-based amorphous material has a nanocrystalline microstructure comprising grain sites of about 8-20 nm in diameter.

In certain aspects, the method of forming a stator magnetic core includes one or more steps wherein at least one of the one or more insulating layers is an insulating paper having a thickness of about 0.02-0.06 mm.

In other various aspects, the method of forming a stator magnetic core includes one or more steps wherein the stator magnetic core is made of iron-based amorphous material containing Co and V.

In other various aspects, the method of forming a stator magnetic core includes one or more steps wherein the composition of the iron-based amorphous material by weight percentage is: Co 1.0-1.2%, V 0.8-1.0%, B 2.9-3.1%, Si 6.7-7.5%, and Fe for the remaining.

In certain aspects, the method of providing a DC brushless motor provides one or more steps wherein the nano-epoxy curing agent is a V852-12A/B adhesive. In other various aspects, the method of providing a DC brushless motor further comprises steps for: machining the stator magnetic core by cutting by a 3500 Ypm carborundum wheel in a cooling emulsion.

In other aspects, the method of providing a DC brushless motor further comprises steps for forming the stator magnetic core with an iron-based amorphous material containing Co and V, wherein the composition of the iron-based amorphous material by weight percentage is: Co 0.8-1.4% V 0.6-1.2%, B 2.7-3.3%, Si 6.5-8%, and Fe.

Figure 5:
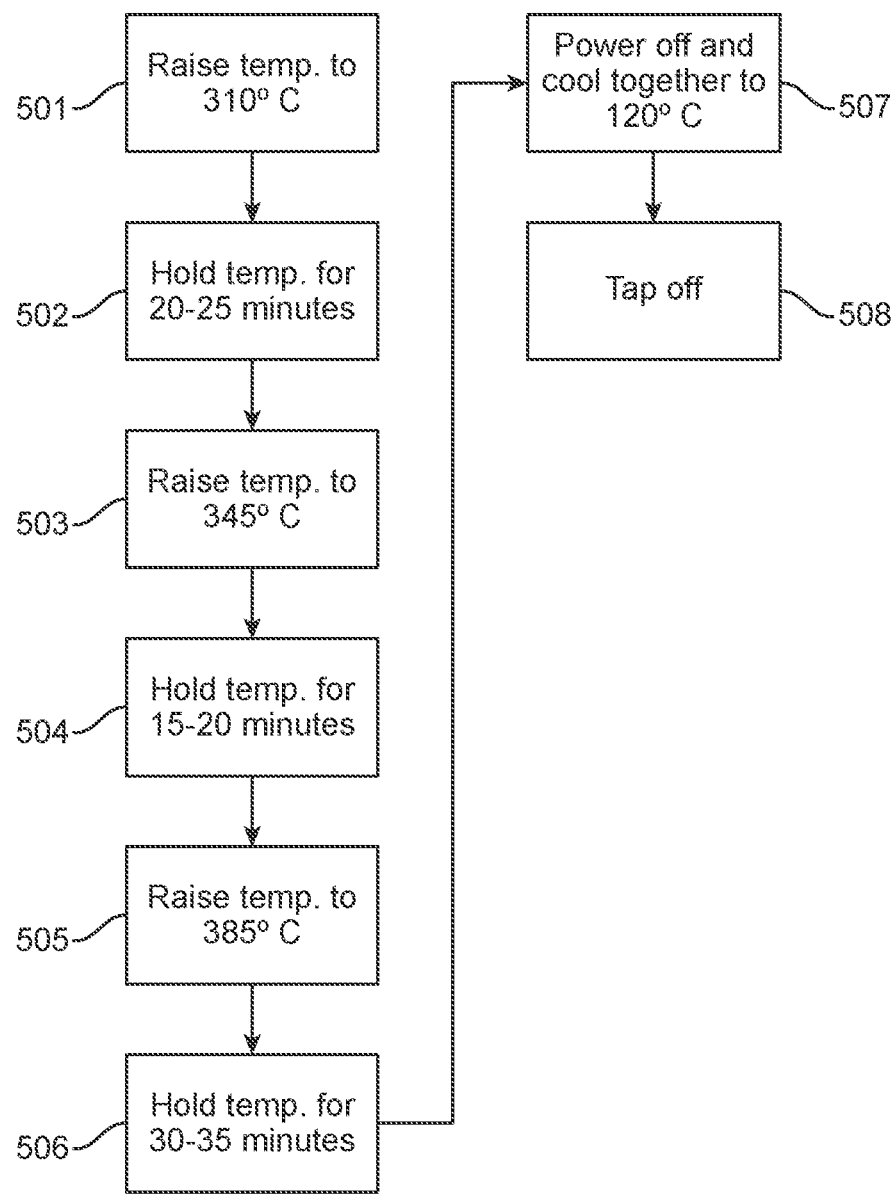
FIG. 5 is a flow diagram of a vacuum heat treatment process of the magnetic core.

In another embodiment as illustrated in FIG. 5, a vacuum heat treatment process of the magnetic core 500 includes steps that raises temperature to 310° C. 501 and hold the temperature for 20-25 min at first 502, then raise temperature to 345° C. 503, and hold the temperature for 15-20 min 504, then raise temperature to 385° C. 505, and bold the temperature for 30-35 min 506, and lastly, power off, cool together with the furnace to 120° C. 507 and tap off 508.

Figure 6:
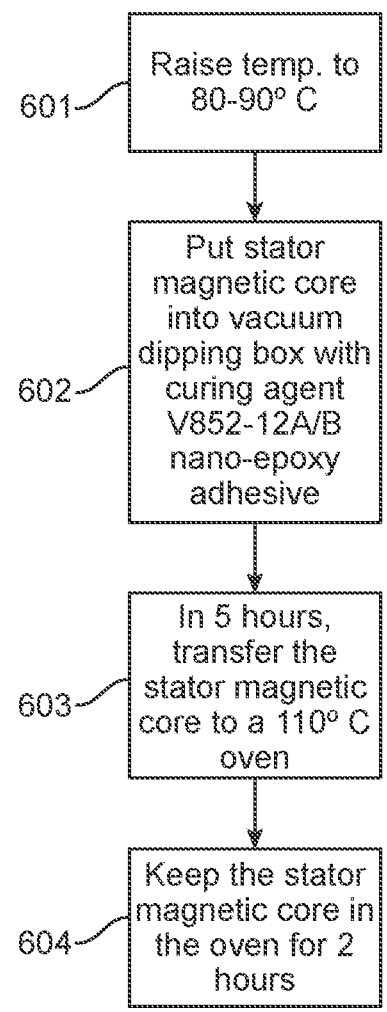
FIG. 6 is a flow diagram of a curing process after heat treatment and shaping of the stator magnetic core.

In another embodiment as shown in FIG. 6, a curing process after heat treatment and shaping of the stator magnetic core 600 raises 601 temperature to 80-90° C., then puts 602 the stator magnetic core into a vacuum dipping box, with curing agent as V852-12A/B nano-epoxy adhesive, transfers 603 the stator magnetic core to a 110° C. oven five hours later, and keeps 604 the stator magnetic core in the oven for two hours.

Figure 7:
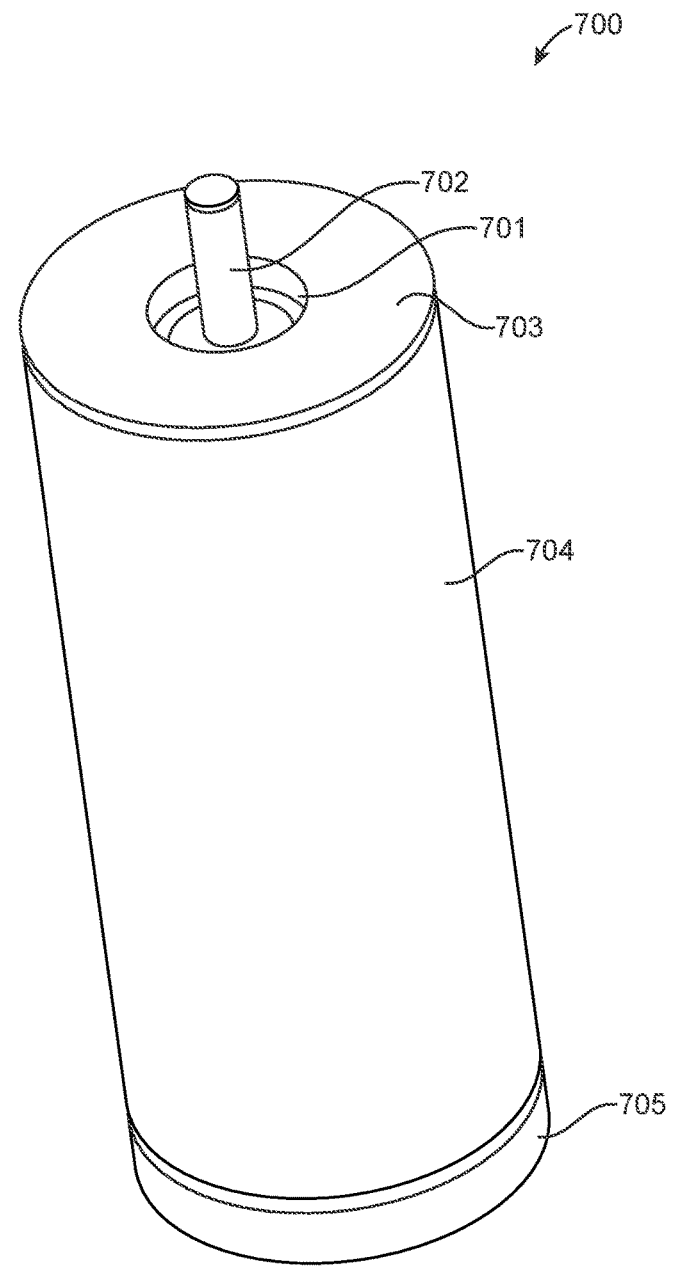
FIG. 7 is an angled, external view of an embodiment of the present invention.

In another embodiment as shown in FIG. 7, a brushless DC motor 700 including the foregoing stator magnetic core 701, further comprises a rotor spindle 702, a front end cover 703, a housing 704, a stator coil 705 separated by one or more insulating layers from the stator magnetic core, and a rear end cover 705 wherein the stator magnetic core is an iron-based amorphous material comprising Co 0.8-1.4%, V 0.6-1.2%, B 2.7-3.3%, Si 6.5-8%, and Fe for the remainder that is heated and cured by one or more steps including a nano-epoxy adhesive compound and then shaped and cut by a 3500 Ypm carborundum wheel under the protection of a cooling emulsion to overcome shaping problems inherent in the core material.

Figure 8:
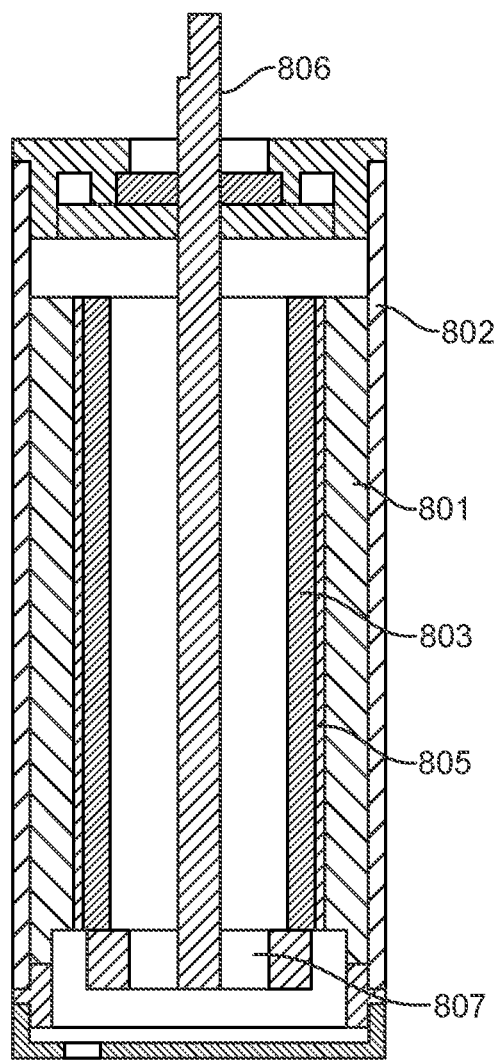
FIG. 8 is front sectional view of an embodiment of the present invention.

Now referring to FIG. 8 in another embodiment, the brushless DC motors of the previous embodiment further comprises a stator magnetic core 801 that is assembled inside the housing 802, a stator coil 803 that is disposed inside the stator magnetic core 801, and wherein the stator magnetic core 801 and stator coil 803 don't contact each other and wherein one or more insulating layers 805 are formed between them. In certain aspects, the embodiment includes the axes of a rotor spindle 806, the stator magnetic core 801 and the stator coil 803 to coincide with each other and wherein at least one of the one or more insulating layers 805 is an insulating paper layer. In various aspects, the stator magnetic core 801 and one or more insulating layers 805 are selected and configured to reach an approximate efficiency of about 87% at full load.

In certain aspects and still referring to FIG. 8, at least one of the one or more insulating layers has an internal voltage of about 5000 v and a thickness of about 0.05 mm. In various aspects, at least one insulating paper layer. In other various aspects, one of the one or more insulating layers is air.

In other various aspects continuing with FIG. 8, the embodiment has a rotor bearing that is disposed at one end of the rotor spindle 806. In certain aspects, a lower portion of the rotor spindle 806 is disposed inside the housing 802. In various aspects, the lower portion of the rotor spindle 806 is disposed inside the housing 802 in an inserted manner.

In other various aspects as shown in FIG. 8, the embodiment is provided wherein the housing 802 is a cylinder with an outer diameter of about 26 mm in certain aspects. The front end cover and the rear end cover are assembled at its upper end and lower end respectively. The center of the front end cover has a round hole from which the rotor spindle 806 protrudes. The rear end cover is disposed in a closed manner. The stator magnetic core 801 is assembled inside the housing 802. The stator coil 803 is disposed inside the stator magnetic core 801. The axes of the rotor spindle 806, the stator magnetic core 801, and the stator coil 803 coincide with each other. The stator magnetic core 801 and the stator coil 803 don't contact each other and one or more insulating layers 806 are formed between them. One or more insulating layers 806 are insulating paper in certain respects. Most of the lower part of the rotor spindle 806 is disposed inside the housing 802 in an inserted manner. A rotor bearing 807 is assembled at its bottom end. Its top end is exposed through the round hole of the front end cover. In one configuration, the full length of the brushless motor is about 65 mm.

In certain aspects, a 30 W brushless DC motor is provided wherein a power control circuit shows DC voltage of 24V and current of 1.43 A. In such a configuration, the input power in certain respects is 34.32 W (P=U*I). Meanwhile, it is measured at the output end of the brushless motor with 24V and current of 1.25 A, i.e. the actual power is 30 W, yielding an efficiency for the brushless motor configuration of 87% (Q=P'/P). The above embodiment is a preferred embodiment of the present invention. It is understood that those skilled in the art will be able to make simple configuration modifications to the concepts herein to provide other configurations of a high efficiency, brushless DC motor with a stator magnetic core comprising alternative materials.

Figure 9:
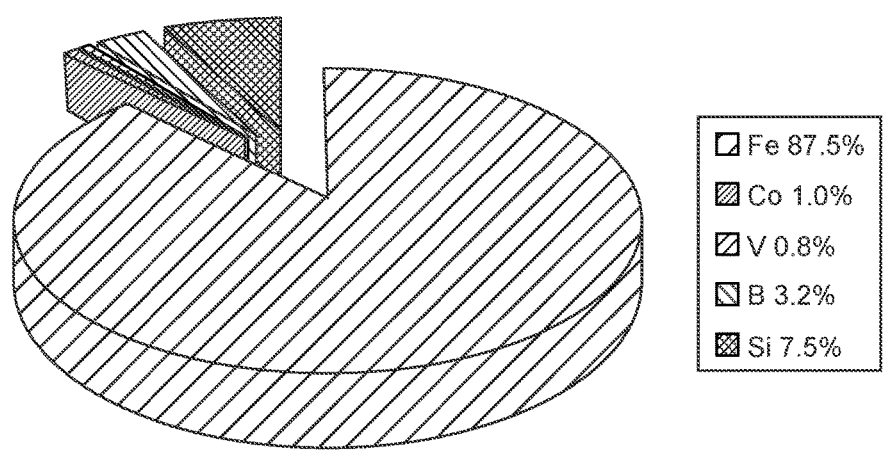
FIG. 9 is a chart representation of the material by weight percentage of the stator magnetic core of the present invention.

In other embodiments, one of which is featured in FIG. 9, a stator magnetic core is made of iron-based amorphous material including Co and V. Through addition of Co and V elements, the stator magnetic core has a refined crystalline grain and raised material toughness.

In certain aspects, a brushless DC motor having the stator magnetic core of the embodiments herein has a motor speed of about 28000 rpm-35000 rpm. In other various aspects, the brushless DC motor of the previous embodiment is capable of running stably at 30000 rpm without overheating.

In another embodiment, a stator magnetic core comprises iron-based amorphous material further comprising Co and V, wherein the composition of the iron-based amorphous material by weight percentage is Co 0.8-1.4% V 0.6-1.2%, B 2.7-3.3%, Si 6.5-8%, and Fe for the remainder.

In certain aspects, as shown in FIG. 9, the stator magnetic core is provided wherein the iron-based amorphous material by weight percentage is more preferably about Co 1%, V 0.8%, B 3.2%, Si 7.5%, and Fe 87.5%.

Figure 10:
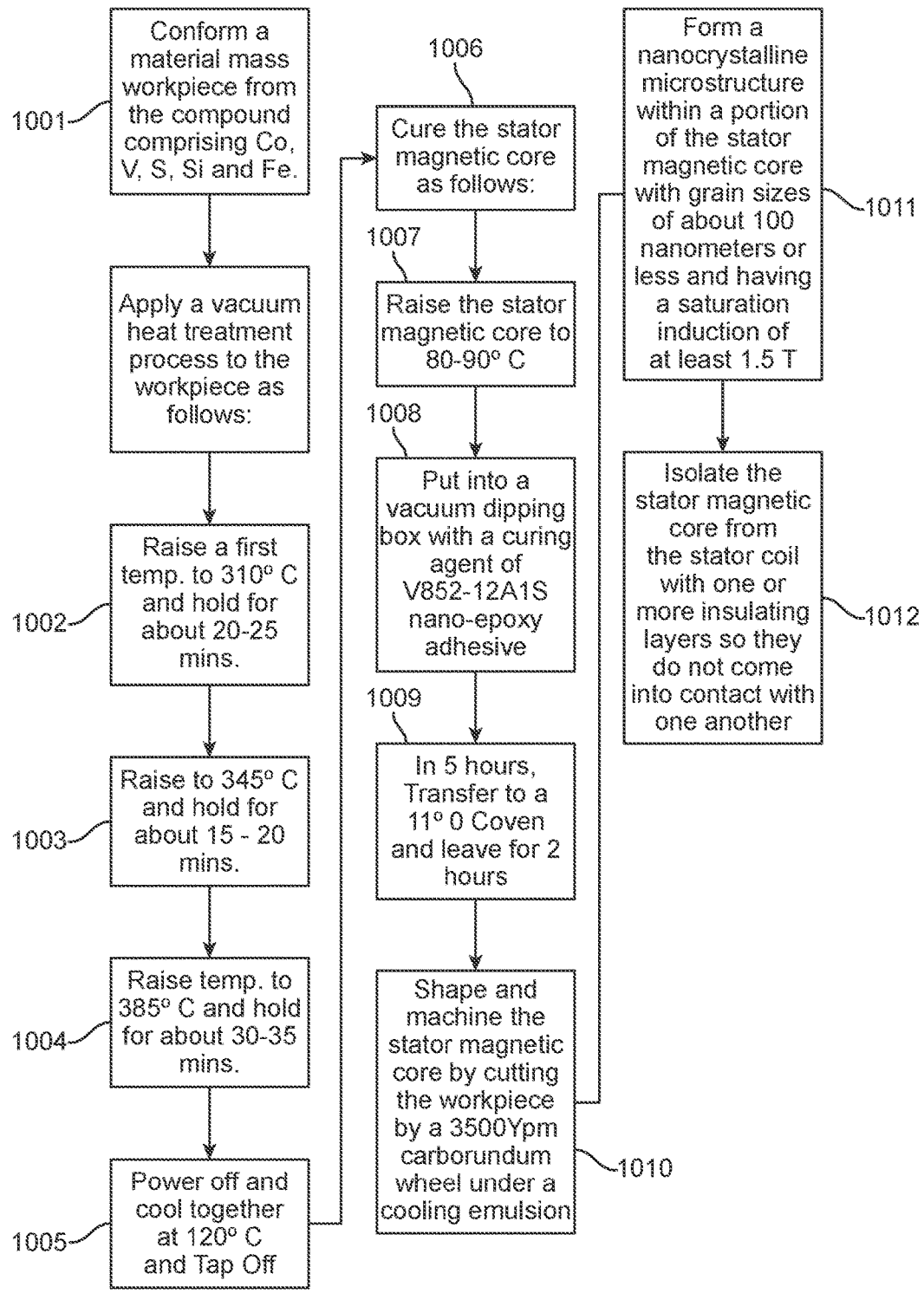
FIG. 10 is a block flow diagram of a method of forming a stator magnetic core in an embodiment of the present invention.

In another embodiment as shown in FIG. 10, a method of configuring a stator magnetic core, comprises steps for: separating a stator magnetic core from a stator coil with one or more insulating layers 1001; isolating the stator magnetic core from the stator coil so that the stator magnetic core does not come in physical contact with the stator coil 1002; disposing the stator coil inside the stator magnetic core 1003; and coinciding an axes of a rotor spindle with the axes of the stator coil and the stator magnetic core 1004.

In another embodiment as shown in FIG. 10, a method of configuring a suitor magnetic core comprises steps for 1001 conforming a material mass work piece from the compound comprising Co, V, B, Si, and Fe, apply a vacuum heat treatment process to the work piece as follows: raise 1002 a first temp to 310 C and hold for about 20-25 minutes, raise 1003 to 345 C and hold for about 15-20 mins.; raise temp 1004 to 385 C and hold for about 30-35 mins., power off and cool together 1005 at 120 C and lap off; cure 1006 the stator magnetic core as follows: raise the stator 1007 magnetic core to 80-90 C, put into 1008 a vacuum dipping box with a curing agent of V852-12A/B nano-epoxy adhesive; in 5 hours, transfer 1009 to a 110 C oven and leave for two hours; shape and machine 1010 the stator core by cutting a work piece by a 3500 Ypm carborundum wheel under a cooling emulsion; form 1011 a nanocrystalline microstructure within a portion of the stator magnetic core with grain sizes of about 100 nanometers or less and having a saturation induction of at least 1.5 T, isolate 1012 the stator magnetic core form the stator coil with one or more insulating layers so they do not come into contact with one another.

In certain aspects, the method of FIG. 10, configuring a stator magnetic core may be provided wherein separating 1012 a stator magnetic core from a suitor coil with one or more insulating layers has at least one of the one or more insulating layers 1012 that is a paper-like substance having a thickness of between about 0.02-0.06 mm.

In other various aspects the method of configuring a stator magnetic core is provided wherein the stator magnetic core is made of iron-based amorphous material containing at least one element selected from the group containing: Co and V 1005 to refine crystalline grain to increase material toughness. In other various aspects, the method of configuring a stator magnetic core is provided wherein the composition of the iron-based amorphous material by weight percentage is: Co 0.8-1.4%, V 0.6-1.2%, B 2.7-3.3%, Si 6.5-8%, and Fe 1007. In certain aspects, the stator magnetic core is provided wherein the iron-based amorphous material by weight percentage is more preferably about Co 1.0-1.2%, V 0.8-1.0%, B 2.9-3.1%, Si 6 7.0-7.5%, and Fe for the remaining.

In certain aspects, the method of configuring a stator magnetic core further comprises steps for: curing 1005 an iron-based amorphous material mass with a nano-epoxy curing agent; shaping 1010 the iron-based amorphous material mass of the stator magnetic core work piece; and machining the iron-based amorphous material mass in a cooling emulsion.

Figure 13:
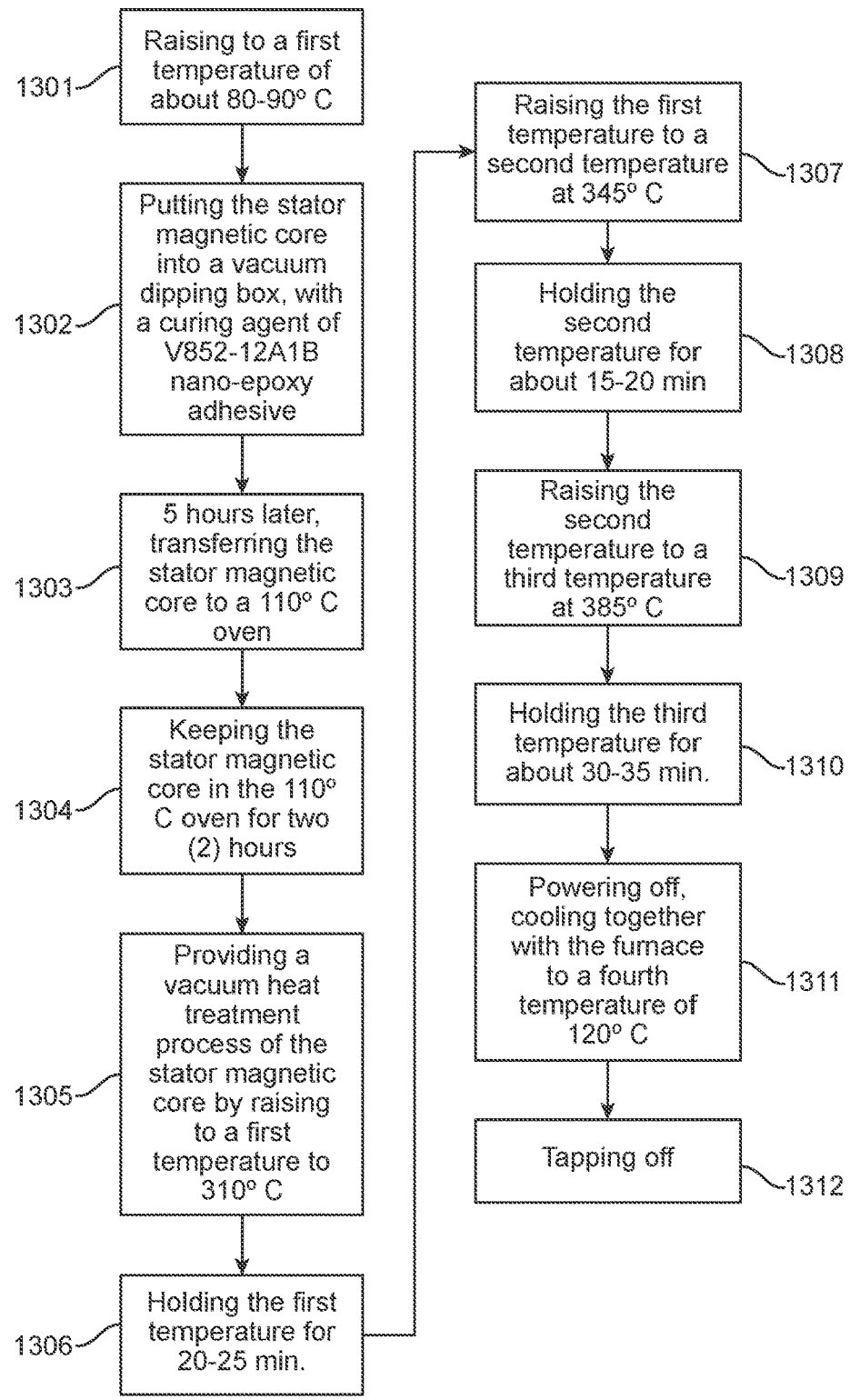
FIG. 13 is a front sectional view of an embodiment of the present invention.

In another embodiment, as shown in FIG. 13, a computer implemented manufacturing process of the stator magnetic core is provided for monitoring one or more process steps of a stator magnetic core via one or more measurement sensors and one or more computers having process control software applications including computer-usable readable storage medium having computer-readable program code embodied therein for causing a computer system to perform methods for one or more programs of one or more process control manufacturing steps for providing steps bar a curing process after the heat treatment process and steps for shaping of the stator magnetic core, including: raising to a first temperature of about 80-90° C. 1301; putting the stator magnetic core into a vacuum dipping box, with a curing agent of V852-12A/B nano-epoxy adhesive 1302; transferring the stator magnetic core to a 110° C. oven five (5) hours later 1303; and keeping the stator magnetic core in the 110° C. oven, for two (2) hours 1304. In certain aspects, the Brushless DC Motor System is manufactured with one or more computer implemented method steps for monitoring one or more process steps of a stator magnetic core via one or more measurement sensors and one or more computers having process control software applications including computer-usable readable storage medium having computer-readable program code embodied therein for causing a computer system to perform methods for one or more programs of one or more process control manufacturing, steps for providing, a vacuum heat treatment process of the stator magnetic core for: raising a first temperature to 310° C. 1305, holding the first temperature for 20-25 min at first 1306; raising the first temperature to a second temperature at 345° C. 1307; holding the second temperature for about 15-20 min 1308; raising the second temperature to a third temperature at 385° C. 1309; holding the third temperature for about 30-35 min 1310; powering off, cooling together with the furnace to a fourth temperature of 120° C. 1311; and tapping off 1312.

Figure 14:
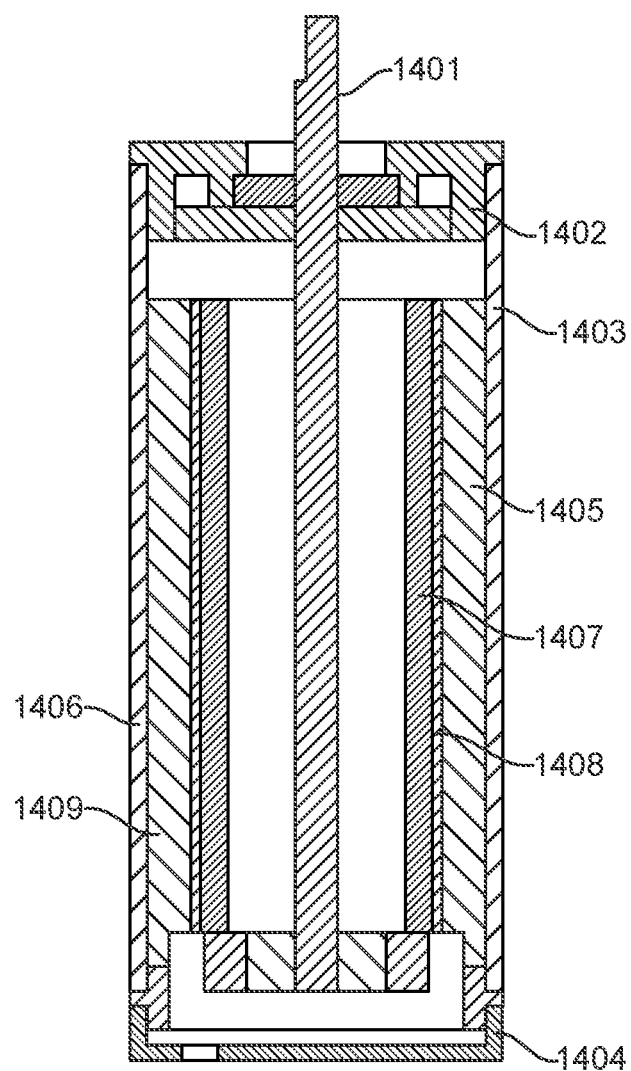
FIG. 14 is a front sectional view of an embodiment of the present invention.

In another embodiments as shown in FIG. 14, a brushless DC motor, comprises a rotor spindle 1401, a front end cover 1402, a housing 1403, a rear end cover 1404 and a stator magnetic core 1405 wherein the stator magnetic core 1405 is assembled inside the housing 1403 and wherein the stator magnetic core 1405 includes nanocrystalline materials with grain sizes of about 10-20 nanometers or less 1406, a stator coil 1407 being disposed inside the stator magnetic core 1405; the stator magnetic core 1405 and the stator coil 1407 not contacting each other; and one or more insulating layers formed between them 1408. In certain aspects, a nanocrystalline microstructure 1409 is formed within at least a portion of the stator magnetic core 1405 having a high saturation induction of at least about 1.5 Tesla (T), low core loss, and low saturation magnetostriction of an absolute value less than $4 \times 10^{-6}$. In other various aspects, the nanocrystalline materials 1406 grain size is about 8-10 nm in diameter.

In certain aspects, the brushless DC motor as shown in FIG. 14 is provided with a stator magnetic core having amorphous alloys that form a nanocrystalline microstructure after curing by a nano-epoxy adhesive wherein the curing agent has a thermal expansion and shrinking coefficient of about 0 ppm, to form bulk amorphous magnetic components having lower operating temperatures that magnetize and demagnetize more efficiently and wherein the stator magnetic core 1405 having one or more insulating a formed between the stator magnetic core and stator magnetic coil includes at least one layer having a thickness of between about 0.015-0.065 mm.

In various aspects, the amorphous alloys may be heat-treated using suitable heating means including infra-red heat sources, ovens, fluidized beds, thermal contact with a heat sink maintained at an elevated temperature, resistive heating effected by passage of electrical current, and inductive (RF) heating.

In other various aspects, the brushless DC motor as shown in FIG. 14 is provided wherein the stator magnetic core and one or more insulating layers are configured to reach a speed of about a range from 28000-35000 rpm. In certain aspects, the stator magnetic core grain 1406 are oriented in the direction of the rolling process. In various aspects, the stator magnetic core grains are comprised of a non-oriented optimized alloy.

In other various aspects, the brushless DC motor as shown in FIG. 14 is provided wherein the stator magnetic core and one or more insulating layers are configured to have a portion of Ion core loss, bulk amorphous metal magnetic components. In certain aspects, the low core loss, bulk amorphous metal magnetic components are cured by a curing agent of V852-12A/B nano-epoxy adhesive. In various aspects, a nano-epoxy adhesive having, a thermal expansion coefficient of about 0 ppm is provided. In various aspects, a nano-epoxy adhesive curing agent is provided having a viscosity of about less than 1000 cps. In other various aspects, suitable methods for applying adhesive include dipping, spraying, brushing, and electrostatic deposition are employed. In various aspects, the nano-epoxy adhesive is applied from an application selected from a group consisting of chemically activated, thermally activated, and exposure to ultra-violet radiation. In other various aspects, the low core loss, bulk amorphous metal magnetic components are bonded by impregnation with the nano-epoxy adhesive, diluted 1:5 by volume with acetone to reduce viscosity and enhance penetration in the grains.

In various aspects, the stator magnetic core grains are configured to operate at a flux density of approximately about 1.3 Tesla (T) and a core-loss of less than or equal to about 5.5 watts-per-kilogram of amorphous metal material.

In various aspects, the brushless DC motor is configured wherein the stator magnetic core and one or more insulating layers are configured to reach a stable speed of about 30000 rpm.

Figure 15:
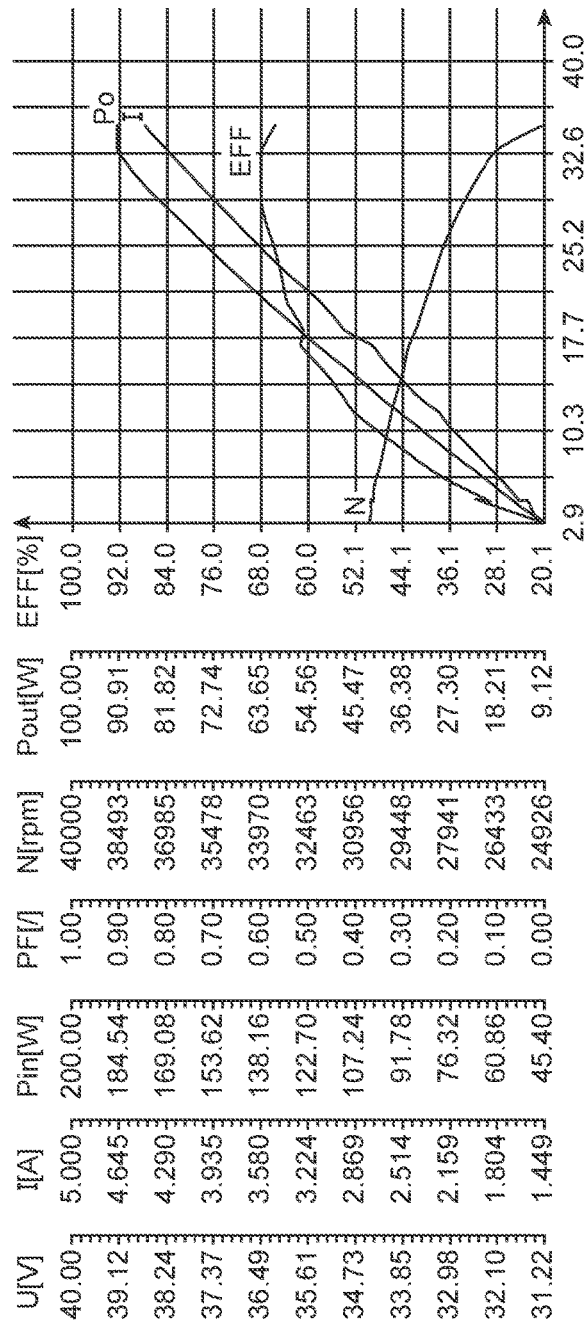
FIG. 15 is a chart showing the stator magnetic core's improved efficiency.

FIG. 15 shows motor characteristic curves and relevant data to one or more embodiments herein. The motor characteristic curve shows efficiency as plotted against torque. One relevant data set describes voltage, amps, input watts, torque, rpms, output watts, and efficiency under various conditions including no load, maximum efficiency, maximum output, maximum torque, and rated.

In some embodiments the disclosure herein can be further illustrated as a systems, methods, and apparatus that integrate the necessary hardware, software and system components into various brushless DC motors and stator magnetic core configurations. The apparatus include varying combinations of brushless motors, stator magnetic cores, and iron-based amorphous materials.

The present invention is described below with reference to block diagrams of systems, methods, apparatuses and computer program products according to embodiments of the invention. It will be understood that each block of the block diagrams and combinations of blocks in the block diagrams, respectively, can be implemented by means of analog or digital hardware and computer instructions or various physical and hardware, power electronics, control, and electrical apparatus components. One or more of the various components may include microprocessor embedded software, ASIC, mobile devices, or other means of implementing computer instructions to the components or machines. These computer instructions may be loaded onto a general purpose computer, special purpose computer, ASIC, or other programmable data processing apparatus to produce a machine, such that the instructions, which execute on the computer or other programmable data, processing apparatus create means for implementing the functions/acts specified in the block or blocks.

The computer program instruction can be provided to a processor of a general purpose computer, special purpose computer, ASIC, or other programmable data processing apparatus, such that the instruction, which execute via the process of the computer or other programmable, data processing apparatus, implements the function/acts specified in the block diagrams or operational block or blocks.

In some alternate implementations, the functions or acts noted in the blocks can occur out of the order noted in the operational illustration. For example, two blocks shown in succession can in fact be executed substantially concurrently or the blocks can sometimes be executed in the reverse order, depending upon the functionality or acts involved.

Reference will now be made in detail to illustrative embodiments of the present invention, examples of which are/may be shown in the accompanying drawings. These inventions may be embodied in different forms and should not be construed as limitations to the embodiments set, forth herein; rather, these embodiments are provided so that the disclosure will satisfy applicable legal requirements, be thorough and complete, and will fully convey the scope of the invention to those skilled in the art.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents. Exemplary Operating Environments, Components, and Technology.

In certain aspects, the methods and systems described herein may be implemented by one or more computer methods and coupled by special purpose hardware, sensors, programmable logic controllers, factory automation, and the like to provide inputs and outputs to any of the methods or manufacturing processes described herein.

Figure 11:
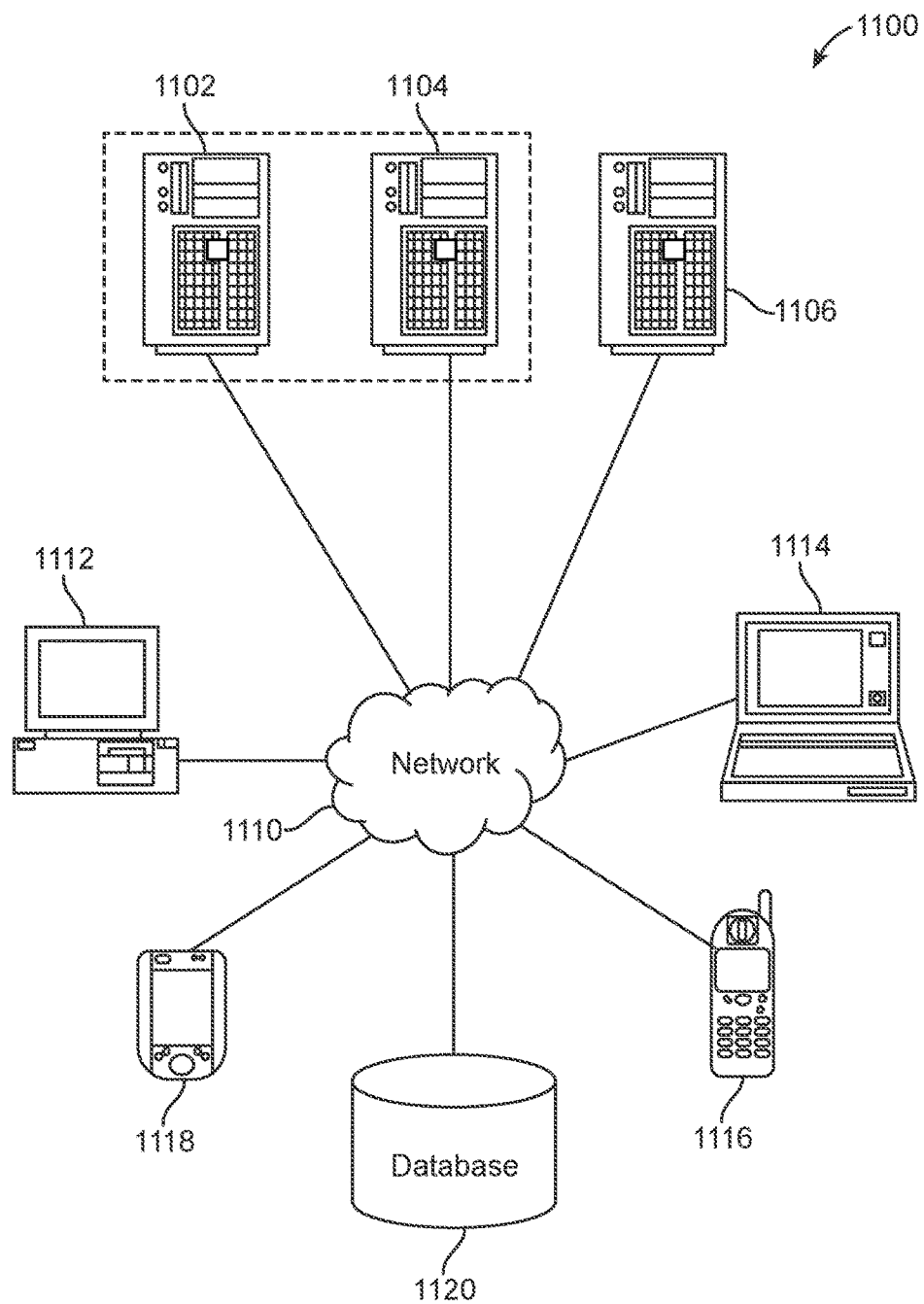
FIG. 11 is an illustration depicting an exemplary operating environment including one or more user computers, computing devices, or processing devices, which can be used to operate a client, such as a dedicated application, web browser is shown.

FIG. 11 is a block diagram illustrating components of an exemplary operating environment in which embodiments of the present invention may be implemented. The system 1100 can include one or more user computers, computing devices, or processing devices 1112, 1114, 1116, 1118, which can be used to operate a client, such as a dedicated application, web browser, etc. The user computers 1112, 1114, 1116, 1118 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1112, 1114, 1116, 1118 may also have any of a variety of applications, including one or more development systems, database client and/or server applications, and Web browser applications. Alternatively, the user computers 1112, 1114, 1116, 1118 may be any other electronic device, such as a thin-client computer, Internet-enabled gaming system and/or personal messaging device, capable of communicating via a network (e.g. the network 1110 described below) and/or displaying and navigating Web pages or other types of electronic documents. Although the exemplary system 1100 is shown with four user computers, any number of user computers may be supported.

In most embodiments, the system 1100 includes some type of network 1110. The network can be any type of network familiar to those skilled in the art that can support data communications using: any of a variety of commercially-available protocols, including without limitation TCP/IP, SNA, IPX, AppleTalk, and the like. Merely by way of example, the network 1110 can be a local area network ("LAN"), such as an Ethernet network, a Token-Ring network and/or the like; a wide-area network; a virtual network, including without limitation a virtual private network ("VPN"); the Internet; an intranet; an extranet, a public switched telephone network ("PSTN"), an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1102, 1104, 1106 which can be general purpose computers, specialized server computers (including, merely by way of example, PC servers, UNIX servers, mid-range servers, mainframe computers rack mounted servers, etc.), server farms, server clusters, or any other appropriate arrangement and/or combination. One or more of the servers (e.g., 1106) may be dedicated to running applications, such as a business application, a Web server, application server, etc. Such layers may be used to process requests from user computers 1112, 1114, 1116, 1118. The applications can also include any number of applications for controlling access to resources of the servers 1102, 1104, 1106.

The Web server can be running an operating system including any of those discussed above, as well as any commercially-available server operating systems. The Web server can also run any of a variety of server applications and or mid-tier applications, including HTTP servers, FTP servers, CGI servers, database servers, Java servers, business applications, and the like. The server(s) also may be one or more computers which can be capable of executing programs or scripts in response to the user computers 1112, 1114, 1116, 1118. As one example, a server may execute one or more Web applications. The Web application may be implemented as one or more scripts or programs written in any programming language, such as Java®, C, C™ or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1112, 1114, 1116, 1118.

The system 1100 may also include one or more databases 1120. The database(s) 1120 may reside in a variety of locations. By way of example, a database 1120 may reside on a storage medium local to (and/or resident in) one or more of the computers 1102, 1104, 1106, 1112, 1114, 1116,

1118. Alternatively, it may be remote from any or all of the computers 1102, 1104, 1106, 1112, 1114, 1116, 1118, and/or in communication (e.g., via the network 1110) with one or more of these in a particular set of embodiments, the database 1120 may reside in a storage-area network ("SAN") familiar to those skilled in the art. Similarly, any necessary files for performing the functions attributed to the computers 1102, 1104, 1106, 1112, 1114, 1116, 1118 may be stored locally on the respective computer and/or remotely, as appropriate. In one set of embodiments, the database 1120 may be a relational database, such as Oracle 10g, that is adapted to store, update, and retrieve data in response to SQL-formatted commands.

Figure 12:
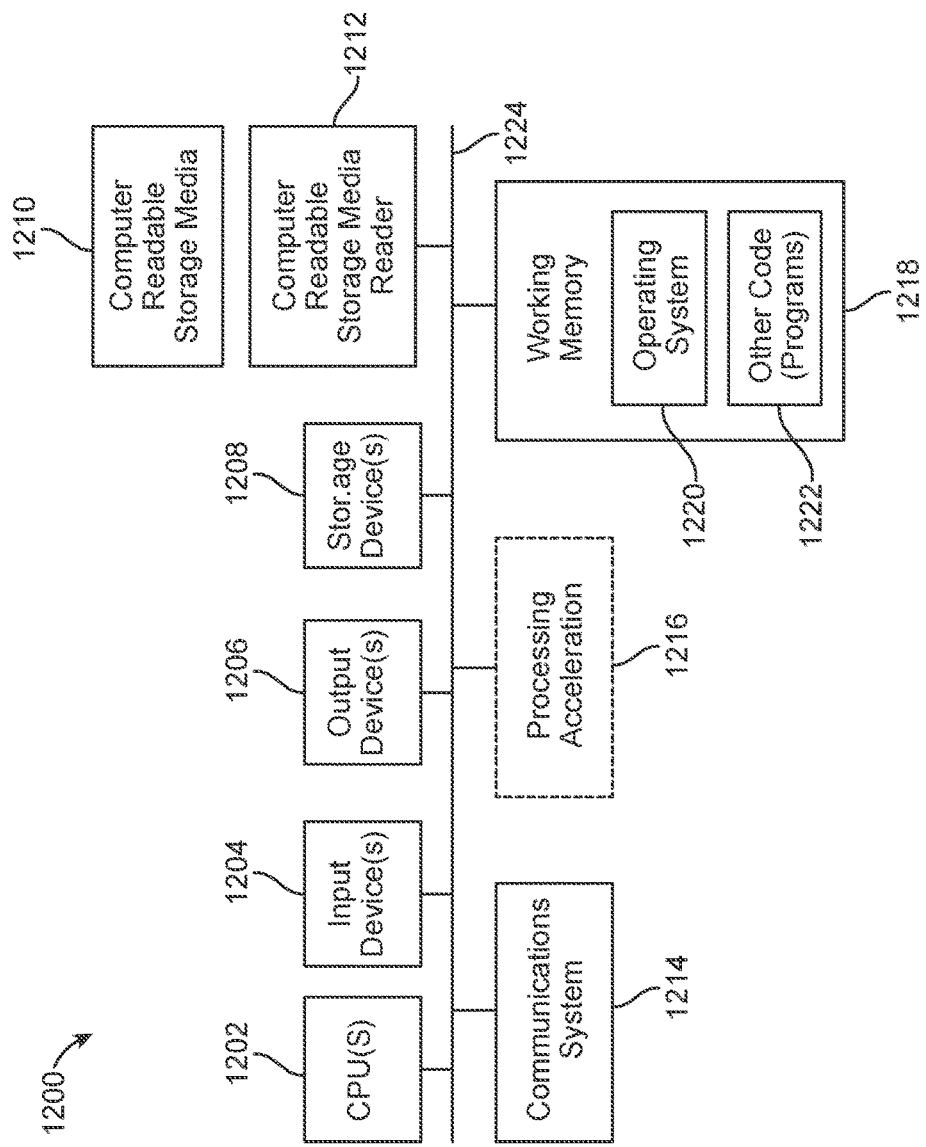
FIG. 12 is another illustration depicting an exemplary operating environment including a computer system with various elements as shown.

FIG. 12 illustrates an exemplary computer system 1200, in which embodiments of the present invention may be implemented. The system 1200 may be used to implement any of the computer systems described above. The computer system 1200 is shown comprising hardware elements that may be electrically coupled via a bus 1224. The hardware elements may include one or more central processing units (CPUs) 1202, one or more input devices 1204 (e.g. a mouse, a keyboard, etc.), and one or more output devices 1206 (e.g., a display device, a printer, etc.). The computer system 1200 may also include one or more storage devices 1208. By way of example, the storage device(s) 1208 can include devices such as disk drives, optical storage devices, solid-state storage device such as a random access memory ("RAM") and/or a read-only memory ("ROM"), which can be programmable, flash-updateable and/or the like.

The computer system 1200 may additionally include a computer-readable storage media reader 1212, a communications system 1214 (e.g., a modem, a network card (wireless or wired), an infra-red communication device, etc.), and working memory 1218, which may include RAM and ROM devices as described above. In some embodiments, the computer system 1200 may also include a processing acceleration unit 1216, which can include a digital signal processor DSP, a special-purpose processor, and/or the like.

The computer-readable storage media reader 1212 can further be connected to a computer-readable storage medium 1210, together (and, optionally, in combination with storage device(s) 1208) comprehensively representing remote, local, fixed, and/or removable storage devices plus storage media for temporarily and/or more permanently containing, storing, transmitting, and retrieving computer-readable information. The communications system 1214 may permit data to be exchanged with the network and/or any other computer described above with respect to the system 1200.

The computer system. 1200 may also comprise software elements, shown as being currently located within a working memory 1218, including an operating system 1220 and/or other code 1222, such as an application program (winch may be a client application; Web browser, mid-tier application, RDBMS, etc.). It should be appreciated that alternate embodiments of a computer system 1200 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

FIG. 12 further illustrates an environment where an on-demand distributed database service might be used. As illustrated in FIG. 13 user systems might interact via a network with an on-demand database. Some on-demand databases may store information from one or more records stored into tables of one or more distributed database images to form a database management system (DBMS). Accordingly, on-demand database and system will be used interchangeably herein. A database image may include one or more database objects. A relational database management system (RDMS) or the equivalent may execute storage and retrieval of information against the database object(s). Some on-demand database services may include an application platform that enables creation, managing and executing one or more applications developed by the provider of the on-demand database service, wherein users accesses the on-demand database service via user systems, or third party application developers access the on-demand database service via user systems.

The security of a particular user system might be entirely determined by permissions (permission levels) for the current user. For example, where a user account identification transaction may involve a portable identification alphanumeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN (local area network), WAN (wide area network), wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level use other common Internet protocols to communicate, such as HTTP, FTP, AFS, WAP, etc. In an example where HTTP is used, a user system might include an HTTP client commonly referred to as a "browser" for sending and receiving HTTP messages to and from an HTTP server at System. Such HTTP server might be implemented as the sole network interface between a system, and network, but other techniques might be used as well or instead. In some implementations, the interface between a system and network includes load sharing functionality, such as round-robin HTTP request distributors to balance loads and distribute incoming HTTP requests evenly over a plurality of servers. At least as for the users that are accessing that server, each of the plurality of servers has access to at least one third party entity system data schema; however, other alternative configurations are contemplated.

According to one arrangement each user system and all of its components are operator configurable using applications, such as a browser, including computer code run using a central processing unit such as an Intel Pentium® processor or the like. Similarly, computer system and additional instances of an enterprise database, where more than one is present) and all of their components might be operator configurable using application(s) including computer code nm using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein. Computer code for operating and configuring systems to intercommunicate and to process web pages, applications and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a Client system and/or server or server system such as, for example, in C, C++, HTML, any other markup language, Java™, JavaScript, ActiveX, any other scripting language such as VBScript, and many other programming languages as are well known. (Java™ is a trademark of Sun Microsystems, Inc.).

The above illustrations provide many different embodiments for implementing different features of the invention. Specific embodiments of components and processes are described to help clarify the invention. These are, of course, merely embodiments and are not intended to limit the invention from that described in the claims.

The invention claimed is:

1. A method of forming a stator magnetic core, comprising steps for: creating a compound of iron-based amorphous material containing at least one element selected from the group consisting of: Co and V, and the compound having a composition by weight percentage of Co 0.8-1.4%, V 0.6-1.2%, B 2.7-3.3%, Si 6.5-8%, and Fe; conforming a material mass workpiece from the compound; applying a vacuum heat treatment process to the workpiece; raising a first temperature to 310° C.; holding the first temperature for 20-25 min at first; raising the first temperature to a second temperature at 345° C.; holding the second temperature for about 15-20 min; raising the second temperature to a third temperature at 385° C.; holding the third temperature for about 30-35 min; powering off, cooling together to a fourth temperature of 120° C.; and tapping off; curing the stator magnetic core by raising the stator magnetic core workpiece to a first temperature of about 80-90° C.; putting the stator magnetic core workpiece into a vacuum dipping box with a curing agent of the nano-epoxy adhesive; transferring the stator magnetic core to a 110° C. oven five (5) hours later; keeping the stator magnetic core in the 110° C. oven for two (2) hours; shaping and machining the stator magnetic core by cutting the stator magnetic core workpiece by a 3500 Ypm carborundum wheel under the protection of a cooling emulsion; forming a nanocrystalline microstructure within a portion of the stator magnetic core with grain sizes of about 100 nanometers or less and having a saturation induction of at least 1.5 Tesla (T) and low core loss bulk amorphous metal magnetic components, wherein the low core loss bulk amorphous metal magnetic components are bonded by impregnation with the nano-epoxy adhesive to provide stator magnetic core grains having a flux density of about 1.3 Tesla (T) and core loss of less than or equal to about 5.7 watts-per-kilogram of amorphous metal material; and isolating the stator magnetic core from the stator coil with one or more insulating layers so that the stator magnetic core does not come in physical contact with the stator coil by disposing the stator coil inside the stator magnetic core separated by the one or more insulating layers.

2. The method of forming a stator magnetic core of claim 1, wherein at least one of the one or more insulating layers is insulating paper.

3. The method of forming a stator magnetic core of claim 1, further includes one or more steps wherein the stator magnetic core is made of iron-based amorphous material containing approximately by weight percentage, about Co 1% and V 0.8%.

4. The method of forming a stator magnetic core of claim 1, wherein the nano-epoxy adhesive is replaced with a nano-epoxy adhesive compound having a thermal expansion and shrink coefficient of about 0 ppm.

5. The method of forming a stator magnetic core of claim 1, wherein the nano-epoxy adhesive is replaced with a compound having a viscosity of about less than 1000 cps and a thermal expansion coefficient of about 0 ppm.

6. The method of forming a stator magnetic core of claim 1, wherein the low core loss, bulk amorphous metal magnetic components are bonded by impregnation with the nano-epoxy adhesive diluted by 1:5 by volume with acetone to enhance penetration in the grains.

7. A stator magnetic core, comprising: an iron-based amorphous material comprising Co and V, wherein the composition of the iron-based amorphous material by weight percentage is Co 0.8-1.4%, V 0.6-1.2%, B 2.7-3.3%, Si 6.5-8%, and Fe for the rest, wherein a curing process after the heat treatment process and shaping of the stator magnetic core comprises steps for: raising to a first temperature of about 80-90° C.; putting the stator magnetic core into a vacuum dipping box, with a curing agent of the nano-epoxy adhesive; transferring the stator magnetic core to a 110° C. oven five (5) hours later; keeping the stator magnetic core in the 110° C. oven for two (2) hours.

8. The manufacturing process of the stator magnetic core of claim 7, wherein the stator magnetic core is cut by a 3500 Ypm carborundum wheel under the protection of a cooling emulsion.

9. A brushless DC motor, comprising: a rotor spindle, a front end cover, a housing, a rear end cover and a stator magnetic core wherein the stator magnetic core is assembled inside a housing and wherein the stator magnetic core includes nanocrystalline materials with grain sizes of about 20 nanometers or less; a stator coil being disposed inside the stator magnetic core; the stator magnetic core and the stator coil not contacting each other; and one or more insulating layers formed between them, a nanocrystalline microstructure portion formed within at least a portion of the stator magnetic core having a high saturation induction of at least about 1.5 Tesla (T), low core loss, and low saturation magnetostriction of an absolute value less than $4\times10^{-6}$; said motor further comprising: a stator magnetic core having amorphous alloys that form a nanocrystalline nanostructure after curing by a nano-epoxy adhesive to form bulk amorphous magnetic components having lower operating temperatures that magnetize and demagnetize more efficiently, wherein the stator magnetic core having one or more insulating layers formed between the stator magnetic core and stator magnetic coil includes at least one insulating paper layer.

10. The brushless DC motor of claim 9 wherein the stator magnetic core and one or more insulating layers are configured to reach a speed of about a range from about 28000-35000 rpm.

11. The brushless DC motor of claim 9 wherein the stator magnetic core grains are oriented in the direction of the rolling process.

12. The brushless DC motor of claim 9 wherein the stator magnetic core grains are comprised of a non-oriented optimized alloy.

13. The brushless DC motor of claim 9 wherein at least one of the stator magnetic core and one or more insulating layers are configured to have at least a portion of low core loss bulk amorphous metal magnetic components.

14. A brushless DC motor, comprising: a rotor spindle, a front end cover, a housing, a rear end cover and a stator magnetic core wherein the stator magnetic core is assembled inside a housing and wherein the stator magnetic core includes nanocrystalline materials with grain sizes of about 20 nanometers or less; a stator coil being disposed inside the stator magnetic core; the stator magnetic core and the stator coil not contacting each other; and one or more insulating layers formed between them, a nanocrystalline microstructure portion formed within at least a portion of the stator magnetic core having a high saturation induction of at least about 1.5 Tesla (T), low core loss, and low saturation magnetostriction of an absolute value less than $4\times10^{-6}$; said motor further comprising: a stator magnetic core having amorphous alloys that form a nanocrystalline microstructure after curing by a nano-epoxy adhesive to form bulk amorphous magnetic components having lower operating temperatures that magnetize and demagnetize more efficiently, wherein the stator magnetic core and one or more insulating layers are configured to reach a speed of about a range from about 28000-35000 rpm, and wherein at least one of the stator magnetic core and one or more insulating layers are configured to have at least a portion of low core loss, bulk amorphous metal magnetic components; and wherein the low core loss, bulk amorphous metal magnetic components are cured by a curing agent of the nano-epoxy adhesive.

15. The brushless DC motor of claim 14, wherein the nano-epoxy adhesive has a viscosity of about less than 1000 cps and a thermal expansion coefficient of about 10 ppm.

16. The brushless DC motor of claim 14, wherein the nano-epoxy adhesive is applied according to a method selected from a group consisting of dipping, spraying, brushing, and electrostatic deposition.

17. The brushless DC motor of claim 14, wherein the nano-epoxy adhesive is selected from a group consisting of chemically activated, thermally activated, and activated by exposure to ultra-violet radiation.

18. The brushless DC motor of claim 14, wherein the low core loss, bulk amorphous metal magnetic components are bonded by impregnation with the nano-epoxy adhesive, diluted 1:5 by volume with acetone to reduce viscosity and enhance penetration in the grains.

19. The brushless DC motor of claim 14, wherein the stator magnetic core grains are configured to operate at a flux density of approximately about 1.3 Tesla (T) and a core-loss of less than or equal to 5.7 watts-per-kilogram of amorphous metal material.

20. The brushless DC motor of claim 14, wherein the brushless DC motor is configured to reach a speed of about 30000 rpm at a steady state.

21. A method of configuring a stator magnetic core, comprising steps for: separating a stator magnetic core from a stator coil with one or more insulating layers; isolating the stator magnetic core from the stator coil so that the stator magnetic core does not come in physical contact with the stator coil; disposing the stator coil inside the stator magnetic core; and coinciding an axes of a rotor spindle with the axes of the stator coil and the stator magnetic core; said method further comprising steps for curing an iron-based amorphous material mass with a nano-epoxy curing agent; shaping the iron-based amorphous material mass of the stator magnetic core workpiece; and machining the iron-based amorphous material mass in a cooling emulsion.

* * * * *